Jan. 9, 1968   A. CHOPRA   3,363,151
MEANS FOR FORMING PLANAR JUNCTIONS AND DEVICES
Filed July 9, 1964   3 Sheets-Sheet 1
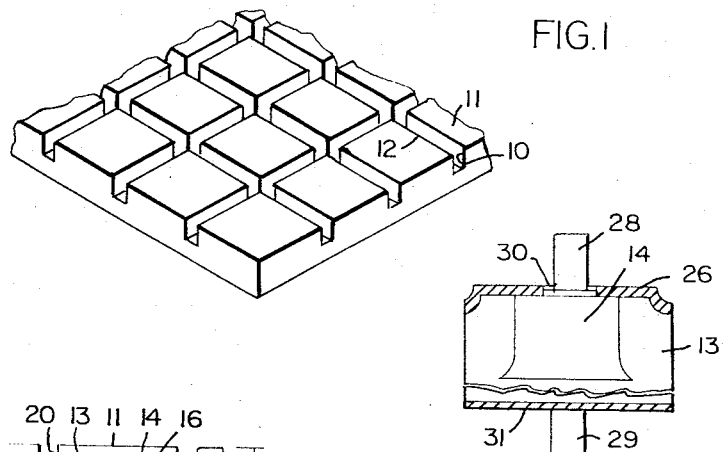
INVENTOR
AMARJIT CHOPRA
ATTORNEYS Jan. 9, 1968     A. CHOPRA     3,363,151
MEANS FOR FORMING PLANAR JUNCTIONS AND DEVICES
Filed July 9, 1964     3 Sheets-Sheet 3
FIG.17
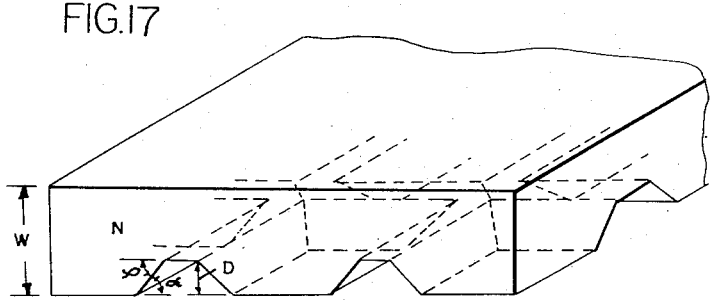
FIG.18
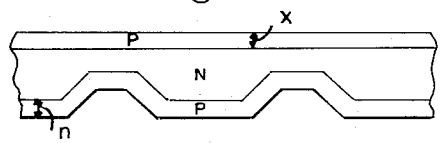
FIG.19
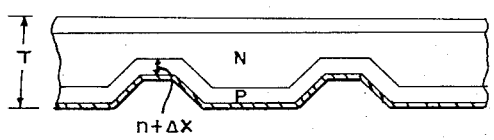
FIG.22
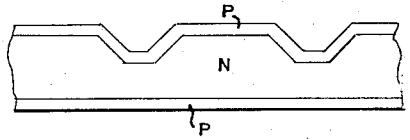
FIG.20
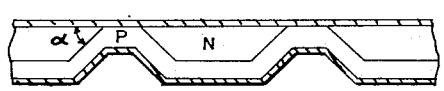
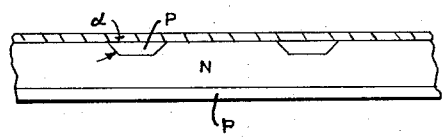
FIG.23
FIG.21
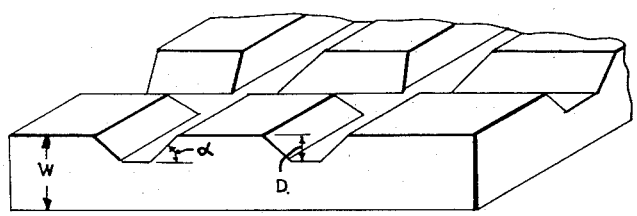
*INVENTOR*
AMARJIT CHOPRA
BY,
*Wolf, Greenfield + Hicken*
ATTORNEYS

United States Patent Office

3,363,151
Patented Jan. 9, 1968

3,363,151
MEANS FOR FORMING PLANAR JUNCTIONS
AND DEVICES
Amarjit Chopra, Cambridge, Mass., assignor to Transitron Electronics Corporation, Wakefield, Mass., a corporation of Delaware
Filed July 9, 1964, Ser. No. 381,395
29 Claims. (Cl. 317—234)

The present invention relates to an improvement in the manufacture of semiconductor devices. More particularly the present invention relates to an improved means and method of forming planar junctions and devices.

Advancements in the semiconductor art have included the fabrication of planar passivated junctions. Such junctions are formed under a masking layer, normally silicon dioxide, and terminate at a planar surface. Well developed techniques are currently used in fabricating such junctions under masking layers of oxides such as silicon dioxide (see Stabilization of Silicon Surfaces by Thermally Grown Oxides, Atala, Tannenbaum and Scheibner, The Bell System Technical Journal, May 1959; Surface Protection and Selective Masking During Diffusion in Silicon, Frosch and Derrick, Journal of the Electrochemical Society, September 1957; A Double Diffused Silicon High Frequency Switching Transistor Produced by Oxide Masking Techniques, Aschner, Battmann, Hare and Kleimack, Journal of the Electrochemical Society, May 1959). Moreover, such junctions are useful in devices such as diodes, transistors, controlled rectifiers and solar batteries. But the standard techniques which have been used heretofore, are restricted to dopants that are masked by the thermally grown or deposited oxide, normally silicon dioxide. Since dopants such as aluminum and gallium are not masked by silicon dioxide in a diffusion perpendicular to a planar surface, planar passivated PN junctions cannot be obtained by normal gaseous vapor diffusion techniques using such dopants.

It is therefore an object of the present invention to provide a means and method of forming planar devices with any dopant normally used to form P or N type semiconductor bodies, whether or not such dopants are normally masked by silicon dioxide during a diffusion process.

Devices made in accordance with the present invention have unique and unexpectedly high reverse voltage breakdown characteristics over large junction areas. Consequently the present invention is particularly useful in the fabrication of planar type high power devices and devices having high reverse voltage breakdown characteristics using planar techniques. And thus this invention effectively extends semiconductor planar technology into the area of high power devices and devices having high reverse voltage breakdown characteristics.

A further object and advantage of the present invention is to provide a means and method of making semiconductor devices with the stability and low leakage currents which are typical of planar passivated junctions made by standard techniques. A further advantage obtained by the present invention is to provide a means and method of fabricating planar devices having junctions insensitive to moisture. One further advantage of the present invention is to provide a means and method of forming planar junctions in semiconductor materials and devices such as controlled rectifiers, transistors, diodes and power rectifiers efficiently, economically and accurately.

One further object of the present invention is to provide a means and method for fabricating semiconductor devices in which relatively thick wafers, from which the devices are fabricated, may be used to minimize the likelihood of breakage while facilitating the mechanical handling of such devices.

A further object of the present invention is to provide a means and method by which planar type devices may be fabricated utilizing diffusion techniques in which oxide masking is not required for the purpose of delineating diffused areas. Another object of the present invention is to provide a means and method in which any type of dopant may be used for a diffusion into silicon, and in particular, in which aluminum may be used as a dopant. In this connection it has been found that aluminum provides significantly better results than boron or gallium as dopants.

Yet another object of the present invention is to provide an improved means and method for deep diffusions. In this invention aluminum, which has a diffusion constant approximately five times that of boron, may be used in the fabrication of planar type devices.

The present invention also makes it possible to obtain planar structures with dopants not normally masked by $SiO_2$ during diffusion. The methods used rely on the properties of the diffusion constant of impurities parallel to the semiconductor surface, and parallel to the semiconductor-oxide interface. The diffusion of impurities along an un-oxidized silicon surface proceeds much more rapidly than diffusion into the bulk of the silicon. However, surface diffusion is sharply limited if the silicon surface is terminated by $SiO_2$.

A further object of this invention is to provide a means and method by which planar type devices may be fabricated that are not sensitive to field effects and consequently are not likely to have surface breakdowns and instability which are common with PN junction devices and particularly high voltage devices.

In the present invention planar passivated PN junctions are formed in semiconductor wafers having grooved surfaces by diffusing an impurity into the wafer to form junctions between the diffused portions and the bulk semiconductor material, with a portion of these junctions extending parallel to or substantially parallel to the sidewalls of the grooves. A portion of the diffused semiconductor material adjacent the grooves is then removed from one surface to expose the PN junctions extending angularly to the surface from which the material is removed. The wafer is then masked to cover the PN junctions and subsequently treated by well known means and methods to further fabricate the wafer into such devices as transistors, diodes, or controlled rectifiers by further diffusion and by the attachments of leads.

These and other objects and advantages of the present invention will be more clearly understood when considered in conjunction with the accompanying drawings in which:

FIG. 1 is a perspective view of a silicon wafer used as a starting material in the present invention;

FIGS. 2 to 5 inclusive are cross-sectional schematic elevations of subsequent steps in the treatment of the silicon wafer shown in FIG. 1 in practicing the present invention;

FIG. 6 is a schematic cross-sectional elevation of a power rectifier or diode made in accordance with the present invention;

FIG. 7 is a schematic cross-sectional elevation of a step subsequent to the step illustrated in FIG. 5 used in the fabrication of a transistor;

FIG. 8 is a schematic cross section of a transistor made in accordance with the present invention in a step subsequent to that of FIG. 5;

FIGS. 9 and 10 are schematic cross-sectional elevations of steps subsequent to the step illustrated in FIG. 5 used in the fabrication of a controlled rectifier;

FIG. 11 is a cross-sectional schematic elevation of a controlled rectifier made in accordance with the present invention;

Figure 12:
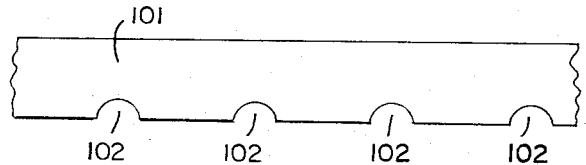
FIG. 12 is a cross-sectional schematic elevation of a silicon wafer used as a starting material in an alternate embodiment of the present invention.

FIGS. 13 to 16 inclusive are cross sectional schematic elevations of subsequent steps in the treatment of the silicon wafer shown in FIG. 12 in practicing the present invention;

FIG. 17 is a perspective view of a silicon wafer used as a starting material in a modification of the present invention;

FIGS. 18 to 20 inclusive are cross sectional schematic elevations of subsequent steps in the treatment of the silicon wafer shown in FIG. 17 in practicing the modification of the invention;

FIG. 21 is a perspective view of the silicon wafer used as a starting material in another modification of the present invention; and FIGS. 22 and 23 are cross sectional schematic elevations of subsequent steps in the treatment of the silicon wafer shown in FIG. 21 in practicing that modification of the invention.

The present invention is designed primarily for use in connection with the fabrication of semiconductor devices such as controlled rectifiers, transistors and power rectifiers using silicon. Consequently, the following description will be directed primarily toward a preferred embodiment of this invention utilizing silicon wafers, but it is understood that the principles herein disclosed may be used in connection with the fabrication of devices formed of other semiconductor materials such as germanium.

As illustrated in FIG. 1, a silicon wafer 10 having a planar surface 11 is formed with a plurality of grooves 12. These grooves are cut downwardly from the surface 11 in a suitable and desired network which may, for example, have the configuration of the grid illustrated. The grooves 12 forming this grid may be cut over a wide range of depths limited primarily by the specific applications for which the invention is used, as will be more fully understood hereafter. The depth of the groove, however, should not be so great as to substantially weaken the mechanical integrity of the wafer, nor should it be so shallow as to make formation of islands as hereafter described, difficult or impossible. Preferably, the grooves should be cut to a depth of approximately one-half the thickness of the wafer. These grooves may be formed by any well known technique such as by ultrasonic cutting or by etching through a mask which may be silk screened or otherwise formed on the surface 11.

The silicon wafer 10 may be either P or N type material depending upon the particular devices which are to be made. While the following description shall, for convenience, assume the silicon wafer 10 is N type material, it should be understood that the same techniques may be used starting with a P type silicon material to obtain devices such as controlled rectifiers, power rectifiers, transistors, etc., of different characteristics.

The bulk silicon wafer 10 of N type material is diffused uniformly with a P type material as illustrated in FIG. 2 so as to form a P diffused layer 13 on an N type substrate 14, (or alternately, if the starting material were P type, an N type diffused layer would be formed on a P type substrate by diffusion of an N type dopant). The substrate 14 is preferably formed as a complete island or isolated body of one type surrounded by silicon of the contrasting type. The island 14 is defined from the diffused layer 13 by the PN junction 15 having an upper segment 16 parallel to the upper surface 11, a bottom segment 17 parallel to the bottom surface 18 and side segments 19 substantially parallel to the side walls 20 of the grooves 12.

The total depth of the diffused junction from both surfaces as indicated by the arrows A and B is greater than one-half W, where W is the difference between the thickness T of the wafer and the depth G of the grooves 12.

Any suitable dopant may be used for diffusing into the silicon wafer. Thus, for example, aluminum, gallium, boron and other P type dopants may be used for P type diffusion into the N type silicon wafer. When the silicon wafer is P type, any suitable N type dopant such as arsenic, antimony, phosphorous or others may be used. In doping N type silicon wafers, aluminum and gallium are preferred as P type dopants, but aluminum has been found to have particularly desirable results. In devices made utilizing aluminum as a P type dopant, breakdown voltages which are unusually high for planar techniques, have been attained, with breakdown voltages of up to 1500 volts being observed in a typical planar passivated junction having areas up to .5″ x .5″. In addition, aluminum has a diffusion constant substantially greater than other dopants which permits a diffusion of up to five times as fast as other dopants such as boron. The preferred diffusion of the dopant into the silicon body 10 is conducted under known techniques preferably within a temperature range of between 1100° to 1350° centigrade in order to assure a controlled diffusion. The diffusion is conducted for a sufficient time so as to permit the formation of the junction 15 to a depth as described above and as illustrated in FIG. 2.

After the silicon wafer 10 has been diffused to form islands or bodies 14 of one type silicon entirely surrounded by a second type silicon, the diffused wafer is then mechanically lapped and chemically polished on surface 11 to remove sufficient silicon so as to form a new upper surface 25 illustrated in FIG. 3 in which the side segments 19 are exposed and form a planar junction on the surface 25. The amount of material removed from surface 11 must be greater than the depth of the PN junction as indicated by arrow A, but less than the sum of the groove depth G and the junction depth on the other side as indicated by arrow B. After the wafer is lapped and polished by known techniques, the island or bodies 14 are exposed on surface 25 but are otherwise entirely surrounded by the diffused layer 13 which in the specific example described is P type silicon. It is not necessary in most applications to remove the entire grooves and a portion of it may be allowed to remain as illustrated in FIG. 3. The exact amount of material which is removed within the limits set forth above depends largely upon convenience in the fabrication steps.

After lapping and polishing of the diffused wafer, the wafer is then oxidized within an oxidizing atmosphere to form a masking layer 26 on the surface of the semiconductor material. This masking layer 26 which in the embodiment disclosed is formed of silicon dioxide, preferably covers the entire upper surface 25. The oxide layer 26 may be formed by conventional and suitable techniques with an oxygen, steam or other oxidizing atmosphere at elevated temperatures, preferably within a range of 900° C. to 1200° C. Preferably the temperature during oxidation is maintained below the temperature at which the first diffusion took place so as to maximize control over the depth of the diffused junction. The diffused junction depth, however, will increase slightly during the forming of the oxidized layer or mask 26. During the oxidation step, diffusion of the dopant along the surface underneath the oxide layer being formed is inhibited by the silicon-silicon oxide interface. The structure thus formed, as illustrated in FIG. 4, thereafter may be fabricated into several different devices. Thus, for example, using known techniques such, for example, as the teachings of U.S. Letters Patent 3,025,589, issued Mar. 20, 1960, to J. A. Hoerni, a diode or power rectifier as illustrated in FIG. 6 may be fabricated or a transistor as illustrated in FIG. 8 may be fabricated, or alternately, a controlled rectifier as illustrated in FIG. 11 may be fabricated.

In the fabrication of diodes or power rectifiers utilizing the teachings of Hoerni, an opening 27 may be formed in the oxide mask 26. This opening 27 exposes only a portion of the body 14. An ohmic contact 28 is then made to the upper surface 25 of the wafer within the opening 27. A similar contact 29 may be made to the underside of the wafer. These ohmic contacts may be made by well known plating or evaporation methods in which gold or like material is deposited and alloyed upon the silicon and leads 28 and 29 respectively are thereafter attached to the device by alloying, soldering or otherwise bonding these leads 28 and 29 to the ohmic contacts formed by the deposited gold. If desired, the lead 28 may be formed of a gold antimony alloy while the lead 29 may be formed of aluminum. The power rectifier thus formed, as illustrated in FIG. 6, has an N type silicon body 14 connected to a gold antimony lead 28 through a low ohmic contact of gold 30 with the junction defined by the body 14 and diffused layer 13 covered by the silicon dioxide masking layer 26. The P type layer 13 is connected through a low ohmic contact 31 to the lead 29.

In the fabrication of transistors such as illustrated in FIG. 8, an opening 27 is formed in the layer 26 as is illustrated in FIG. 7 of one segment of the wafer of FIG. 4. This opening may be formed by any suitable photoresist technique followed by etching. The opening 27 is dimensioned so that the PN junction side segments 19 are concealed and protected by the layer 26. The layer 26 thereby serves as a mask to protect the transistor surface and the junctions. A suitable P type material is then diffused through the opening 27 to form a P type layer 35 entirely contained within the body 14 and having a junction with the body 14 extending to the planar surface 25 beneath the oxide layer 26. There is thereby formed by this step a three layer device having two junctions extending to the planar surface 25. Transistor leads 36, 37 and 38 may then be connected respectively to layers 35, 14 and 13 by suitable well known techniques to form respectively connections to an emitter base and collector of a transistor.

If desired, a controlled rectifier as illustrated in FIGS. 9 to 11 may be made utilizing the same techniques as set forth above. In the fabrication of a controlled rectifier a single segment of the silicon wafer formed as illustrated in FIG. 4 has an opening 50 formed therein. The body 14 beneath the opening 50 is then subject to a diffusion so as to form a portion 51 of a type contrasting to the type silicon of body 14. Following this, a portion of the opening 50 is closed by growing a segment of oxide 53, as illustrated in FIG. 10. A subsequent diffusion through opening 50A of an impurity contrasting to the impurity used in forming body 51, thereafter forms a portion 54. These diffusions may utilize well known techniques as exemplified by U.S. Letters Patent 3,025,589. Following this, suitable apertures may be made in the oxide coating 26 so that leads 55 and 56 having low ohmic contacts may be made respectively to the bodies 51 and 14 with another lead 57 having a low ohmic connection to the bottom surface of the diffused layer 13.

In experimental devices which have been made in the form of a power rectifier such as illustrated, for example, in FIG. 6, aluminum as well as gallium were used as dopants to form a P type diffused layer on an N type silicon wafer. In a device made with aluminum as a dopant to form the P type diffused layer, a relatively large PN junction having a surface area of approximately .5″ x .5″ was fabricated. This device was found to have a reverse breakdown voltage of up to approximately 1500 volts with reverse leakage currents in an approximately $10^{-7}$ amp. range for an N type wafer resistivity of 15 ohm centimeters and with a diffused P region depth of .005″. The junction characteristics of this particular device were insensitive to moisture. The stability and low leakage currents observed were typical of planar passivated junctions made by other techniques. However, the breakdown voltage observed of up to 1500 volts is considered in excess of those obtained by other planar techniques. Moreover, the junction area of .5″ x .5″ represents an order of magnitude significantly higher than can be obtained by utilizing standard planar technology.

A further embodiment of this invention is illustrated in FIGS. 12 to 16. This embodiment also permits the use of any type of dopant, especially aluminum or gallium, which cannot otherwise be used in conventional planar techniques because of their propensity to diffuse through the oxide layers normally used in such techniques. In this arrangement a grid of grooves 102 are formed on one surface 104 of a semiconductor body 101 extending angular to one another. The body 101 is formed of a semiconductor material, preferably silicon of one type, as for example, N type. This silicon body 101 is then diffused with a dopant of the type opposite to the type characteristics of the body 101. Any suitable dopant may be used, but preferably in doping an N type body, such as described in this example, gallium or aluminum is used. These dopants diffuse into the body 101 from opposite surfaces 103 and 104 to form junctions 105 and 106 in spaced relation to each other, within the silicon body. Each junction is generally parallel to the surface from which the impurity that formed it was introduced. The junctions are, therefore, non-parallel in the areas adjacent the grooves 102. The junctions 105 and 106 thus define an intermediate body 107 of one semiconductor type with a narrow portion adjacent the grooves and outer bodies of the opposite semiconductor type at 108 and 108'.

Figure 13:
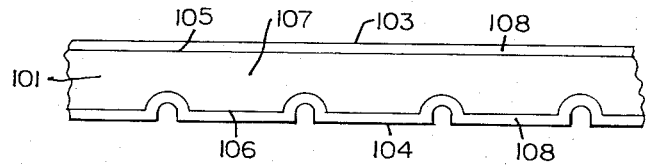
Figure 14:
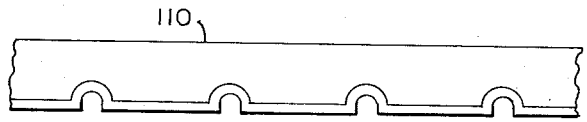
Figure 15:
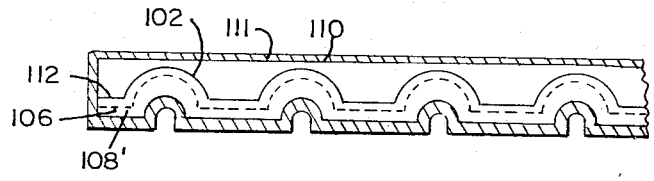
Figure 16:
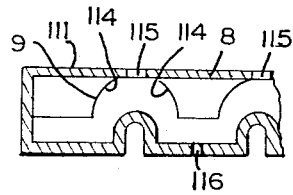

Following the diffusion step illustrated in FIG. 13, the surface 103 is lapped and etched polished to remove the outer body 108 and to form a new surface 110 preferably in the intermediate body 107. After the new surface 110 has been formed, as illustrated in FIG. 14, the body 101 has protective insulated coatings formed on it, preferably by subjecting the body to oxidation to form an oxide layer 111, preferably around the entire body. The body is oxidized at a relatively low temperature, preferably in the range of 900° to 1100° C. During the oxidation step, slight additional diffusion takes place and the junction 106 is reformed deeper in the body 101 at a new junction 112. However, diffusion of the dopant forming the layer 108' to the non-grooved surface 110 during the oxidation step is prevented by the silicon silicon-oxide interface which inhibits diffusion of the dopant along this interface. After the body 101 has been coated with an oxide layer as illustrated in FIG. 15, the body is subject to further diffusion by subjecting it to heat in the higher range of approximately 1100° C. to 1350° C. in the absence of a dopant source. This further diffusion causes the PN junction 112 to diffuse further into the body 101 and to extend to the surface 110, thereby creating a new junction 114 which extends to and terminates on surface 110, immediately beneath the silicon oxide layer 111. Thus, the junction 114 at the interface of the layer 111 is formed without exposing the termination of the junction 114 to the atmosphere. Following this further diffusion, openings are formed in the layer 111 at 115 and 116 for the attachment of leads by suitable means previously described. The individual components may then be separated from the body.

FIGS. 17 to 23 inclusive illustrate embodiments of this invention designed to fabricate planar type devices in which the electric field at the intersection of the junctions and the surface of the device are minimized. In this connection it has been known that PN junctions have associated with them high electric fields at their junctions under conditions of applied reverse bias. This field can cause surface breakdown and instability at the termination of the junction with a surface of the device. Even in planar structures where the junction is terminated at a surface covered by a passivating oxide, high fields cause localized breakdown or charge migration on the oxide which leads to "channel" formations which result in increased leakage currents. High voltage devices are particularly sensitive to such effects, primarily because of the high resistivity semiconductor material that is necessary for their fabrication.

Earlier work has indicated that the field at the junction surface is a function of the angle between the plane in which the surface lies and the plane containing the junction at the intersection of the surface and junction. Earlier work has also suggested that a considerable reduction in the surface field can be attained with the use of small angles. High voltage mesa structures have been constructed utilizing such concepts, but all such structures insofar as known, were nonplanar and nonpassivated.

This invention, however, provides means in which planar junction structures can be fabricated with PN junctions terminated at a plane surface, covered with a passivating oxide and with a junction meeting the surface at an appropriately small angle. Such cannot be obtained in conventional planar structures where a junction is formed by diffusion through an opening in a silicon dioxide layer. In addition, the techniques shown in these modifications of the invention can be used with any dopants, including those that cannot normally be used in conventional planar techniques.

The embodiment shown in FIGS. 17 to 20 will be described in connection with P diffused regions and N base material. However, this technique can be used with N diffused regions in a P base material. A starting semiconductor material, preferably silicon, of N-type having a thickness W is formed with a grid of grooves preferably extending at right angles to each other. Each groove has a depth D and a side angle $\alpha$. These grooves may be formed by any suitable means, such as ultrasonic cutting, etching or electro-forming.

The grooved wafer is subjected to a P-type diffusion at an elevated temperature, typically 1100° C. to 1300° C., using any suitable impurity, such as boron, gallium or aluminum. The time and temperature of the diffusion are conventional in nature, but should be sufficient to form a P layer with a depth X. The diffused region follows the contour of the surface. The depth X is such that 2X is less than $W-D$. That is, 2X is less than the thickness of the thinnest portion of the grooved wafer.

The ungrooved side only of the diffused wafer is then lapped and etched by conventional means to remove the P diffused region and to suitably prepare this surface for oxidation. The amount of material that is removed is greater than X but less than $(W-D)-2X$. Thus, some N-material remains above the grooves.

The wafer is then subjected to an oxidation step to grow a layer of silicon dioxide over the entire surface as illustrated in FIG. 19. This oxidation step may be accomplished by conventional means at a typical temperature of between 700° C. and 1300° C. in oxygen, steam or other oxidizing ambient atmosphere. If the oxidation temperature is low compared with the original P diffusion temperature, the diffused P region increased in depth fracitonally to $X+\Delta X$ during this step as illustrated in FIG 19. The new wafer thickness is illustrated as T.

After the oxidation step, the wafer is subjected to further diffusion without any impurity vapor. When subjected to this further diffusion, the P region increases in depth until it meets the top surface of the wafer, as illustrated in FIG. 20. This last diffusion step may be combined with the previous oxidation step if the oxidation is carried out at a high enough temperature for suitable P region depth increase, without requiring oxidation for an excessively long time.

The wafer now consists of a planar PN junction having the junction at a suitable angle $\alpha$ with the plane surface. The termination of the junction at the surface was formed under a silicon dioxide layer, which effectively protected the formation of the junction at all times. This wafer thus has a passivated junction which may be fabricated into a semiconductor device by further steps, utilizing the techniques described in connection with FIGS. 1 to 16. In this connection, holes may be cut into the oxide for suitable contacts to the P and N regions to obtain a finished diode, or for subsequent planar diffusions to form transistor or controlled rectifier devices. As indicated, the oxide under which the junction has been formed, remains on the semiconductor material at all times so that the advantages of junction protection at all times are attained in this method.

An alternate method is illustrated in FIGS. 21 to 23. In this arrangement devices may be made in which field effects are also minimized. The essential difference between the methods just described in connection with FIGS. 17 to 20 and the modification of these methods shown in FIGS. 21 to 23 is that in the method shown in FIGS. 17 to 20 a junction is terminated under an oxide layer without exposing the surface of the junction at any time. In the method illustrated in FIGS. 21 to 23, the junction is exposed, cleaned and then covered with silicon dioxide. But even in these methods, characteristics typical of junctions formed under an oxide layer at all times may be attained, if there is an appreciable increase in the diffused region depth during oxidation or subsequent to it. The junction thereby moves to a new depth, and the final position at which the junction is formed will be under an oxide layer previously deposited at that location.

Referring specifically to FIG. 21, there is illustrated a starting semiconductor material of suitable N-type silicon material having a thickness W, with the upper surface having a grid of grooves formed in it with a depth D and side angles $\alpha$. These grooves may be formed most suitably by ultrasonic cutting as previously indicated, but other techniques may be used. Similar to the previously described embodiment, the grooved wafer is subject to a P-type diffusion at an elevated temperature using suitable impurities such as boron, gallium or aluminum. The time and temperature of the diffusion are such as to form a P layer having a depth X and may be conventional as previously described. The diffused region follows the contour of the surface. The depth X is such that 2X is less than $W-D$ or the thinnest portion of the grooved wafer. The wafer as thus formed, as illustrated in FIG. 22, is further treated to remove the projections on the upper surface. These projections may be removed by any suitable means such as lapping or etching. In addition, the surface is cleaned and repaired to receive an oxide deposit by conventional techniques. A silicon oxide layer is then deposited on the upper surface, as illustrated in FIG. 23, by suitable techniques of the types previously described. As previously indicated, during the deposition of the silicon oxide layer, the junction may move to a new depth if there is an appreciable increase in the diffused region during oxidation. Under such conditions, the final position of the junction at the surface of the semiconductor material is at a location underneath the previously formed oxide. The wafer may then be further fabricated into a semiconductor device such as a diode, transistor or controlled rectifier using the techniques hereinbefore described.

What is claimed is:

1. A method of making semiconductor devices which method includes the steps of, diffusing an impurity of one type conductivity into a semiconductor substrate of opposite type conductivity to form a plurality of internal islands inside said substrate which internal islands are of said opposite type conductivity established by said impurity along a rectifying junction surrounding the entire volume of an enclosed island and separating each island from the enclosed region, and removing material from said substrate to form an exposed surface exposing at least a portion of each island, a portion of each rectifying junction and a portion of each enclosing region.

2. A method in accordance with claim 1 and further including the step of coating said exposed surface with a masking layer that masks at least the exposed portion of each rectifying junction while exposing in an opening through said masking layer at least an exposed portion of each island.

3. A method in accordance with claim 2 and further including the step of attaching an electrode through each of said openings to each of said islands.

4. A method in accordance with claim 3 and further including the step of attaching an electrode to each surrounding region.

5. A method in accordance with claim 2 and further including the step of diffusing into a predetermined surface portion of said surrounding region an impurity of said opposite type to form another rectifying junction.

6. A method in accordance with claim 5 and further including the step of attaching an electrode to said predetermined surface portion.

7. A method in accordance with claim 6 and further including the step of attaching an electrode to said exposed surface through an opening in said masking layer exposing at least an exposed portion of said surrounding region.

8. A method in accordance with claim 1 and further including the step of first forming intersecting grooves in the surface of said substrate before performing said diffusing step.

9. A method in accordance with claim 8 and further including the step of,
removing material from said substrate to form an exposed surface exposing at least a portion of each island, a portion of each rectifying junction and a portion of each enclosing region.

10. A method in accordance with claim 9 and further including the step of coating said exposed surface with a masking layer that masks at least the exposed portion of each rectifying junction while exposing in an opening through said masking layer at least an exposed portion of each island.

11. A method in accordance with claim 10 and further including the step of attaching an electrode through each of said openings to each of said islands.

12. A method in accordance with claim 11 and further including the step of attaching an electrode to each surrounding region.

13. A method in accordance with claim 10 and further including the step of diffusing into a predetermined surface portion of said surrounding region an impurity of said opposite type to form another rectifying junction.

14. A method in accordance with claim 13 and further including the step of attaching an electrode to said predetermined surface portion.

15. A method in accordance with claim 14 and further including the step of attaching an electrode to said exposed surface through an opening in said masking layer exposing at least an exposed portion of said surrounding region.

16. A semiconductor device made by the method of claim 1.

17. A method of forming a semiconductor device having a planar junction comprising,
forming a semiconductor body of one conductivity type with opposed surfaces having a plurality of grooves extending angularly to and intersecting one another in at least one of said surfaces,
diffusing an impurity of the conductivity type opposite said one conductivity type into said body to form isolated islands of said one conductivity type enclosed by a PN junction within said wafer with said junction extending in multiple planes substantially parallel to the wall of said grooves, and
removing a layer of said material along a plane intersecting said PN junction planes.

18. A method as set forth in claim 17 wherein aluminum is said impurity.

19. A method as set forth in claim 1 wherein gallium is said impurity.

20. A method of forming a semiconductor device comprising,
forming a semiconductor body of one conductivity type with opposed planar surfaces and a plurality of intersecting grooves extending angularly to one another in a surface of said planar surfaces,
diffusing an impurity of the conductivity type opposite said one conductivity type into said wafer to form an internal island enclosed by a PN junction within said wafer, with said junction spaced from both of said surfaces and portions thereof extending angularly to each of said planar surfaces,
thereafter removing portions of said wafer from one of said surfaces of said planar surfaces and thereby exposing said angularly extending portions of said junction through said wafer to the side thereof from which said portions were removed, and thereafter connecting leads to said wafer on opposite sides of said exposed junction.

21. A method as set forth in claim 20 wherein said impurity is diffused into said wafer from both of said planar surfaces.

22. A method as set forth in claim 21 wherein said removed portions of said wafer are removed from said one surface in which said grooves are formed.

23. A method as set forth in claim 22 wherein said impurity is diffused through said planar surfaces to a depth which is less than one-half the thicknes of said wafer between said planar surfaces, and more than one-half the difference of the thickness of said wafer between said planar surfaces minus the depth of said grooves.

24. A method as set forth in claim 23 wherein the thickness of said removed portions is greater than the depth of said impurity from said one surface but less than the sum of the depth of said grooves and the depth of the junction from said other surface.

25. A method as set forth in claim 24 wherein said portions are removed to expose said angularly extending portions of said junction, and form a new planar surface,
and further including the step thereafter forming an oxide mask over said new planar surface and forming holes in said oxide mask to portions of said new planar surface spaced from the portions of said junctions which extend to said new planar surface, said leads being connected to said wafer through said holes.

26. A method as set forth in claim 21 wherein said removed portions of said wafer include the portions of said wafer diffused from the other of said planar surfaces, and a new planar surface is formed by said removing portions.

27. A method as set forth in claim 26 including forming an oxide mask over said new planar surface,
thereafter further diffusing the PN junction formed within and remaining in said wafer after said removal deeper into said wafer until portions thereof extend to said new planar surface, removing portions of said oxide mask over said new planar surface to form holes in said oxide mask connected to portions of said new planar surface spaced from the portions of said junctions which extend to said new planar surface, said leads being connected to said wafer through said holes.

28. A method as set forth in claim 27 wherein said groove has sidewalls that form an angle to the planar surface in which they are formed that is non-perpendicular.

29. A method as set forth in claim 24 wherein said groove has sidewalls that form an angle to the planar surface in which they are formed that is non-perpendicular.

(References on following page)

References Cited

UNITED STATES PATENTS

| | | | |
|---|---|---|---|
| 2,875,505 | 3/1959 | Pfann | 29—25.3 |
| 3,005,937 | 10/1961 | Wallmark et al. | 317—235 |
| 3,025,589 | 3/1962 | Hoerni | 29—25.3 |
| 3,038,085 | 6/1962 | Wallmark et al. | 307—88.5 |
| 3,092,522 | 4/1963 | Knowles et al. | 148—1.5 |
| 3,151,007 | 9/1964 | Dahlberg | 148—177 |
| 3,163,916 | 1/1965 | Gault | 29—25.3 |
| 3,179,860 | 4/1965 | Clark et al. | 317—234 |
| 3,204,321 | 9/1965 | Kile | 29—25.3 |
| 3,247,428 | 4/1966 | Perri et al. | 317—234 |
| 3,257,626 | 6/1966 | Marinace et al. | 331—94.5 |
| 3,279,963 | 10/1966 | Castrucci et al. | 148—188 |
| 3,290,539 | 12/1966 | Lamorte | 313—114 |

JOHN W. HUCKERT, *Primary Examiner.*

R. F. SANDLER, *Assistant Examiner.*